March 12, 1957 F. W. LEFFER 2,785,110
PROCESS AND APPARATUS FOR THE CONVERSION
OF HYDROCARBONACEOUS SUBSTANCES
Filed Feb. 6, 1953

INVENTOR:
Frederick W. Leffer

By: Chester J. Giuliani
Philip T. Liggett
ATTORNEYS:

United States Patent Office 2,785,110
Patented Mar. 12, 1957

2,785,110

PROCESS AND APPARATUS FOR THE CONVERSION OF HYDROCARBONACEOUS SUBSTANCES

Frederick W. Leffer, Riverside, Ill., assignor to Universal Oil Products Company, Des Plaines, Ill., a corporation of Delaware Application February 6, 1953, Serial No. 335,551

14 Claims. (Cl. 196—52)

This application is a continuation-in-part of my co-pending applications Serial No. 164,976 filed May 29, 1950, now Patent No. 2,727,910, Serial No. 333,925 filed January 29, 1953, now abandoned, and Serial No. 54,308 filed October 13, 1948, now Patent No. 2,629,684, February 24, 1953.

This invention relates to an improved method and apparatus for effecting the catalytic conversion of hydrocarbonaceous reactants, the operation being particularly adaptable to the conversion of normally liquid hydrocarbon charge streams. The arrangement of the contacting zones and the flow through the unit are such as to provide intimate contact of the reactant stream with dispersed subdivided solid catalyst within a reaction zone and countercurrent flow between the used catalyst particles and a gasiform reconditioning or regenerating medium within a regenerating zone, as well as means for utilizing and retaining a maximum amount of heat within the unit.

It is a principal object of this invention to provide an improved method for converting a hydrocarbonaceous reactant stream in the presence of solid catalyst particles which are maintained in circulation through a reaction zone and a regenerating zone of a compact contacting unit and which, during their downward travel through the reaction zone, are maintained therein at a lower concentration than in the remaining portions of the catalyst cycle.

It is also a major object of the invention to provide an operation permitting the concomitant contacting of the catalyst particles in countercurrent flow with a stream of the organic reactant and in countercurrent flow with a stream of regenerating medium in reaction and regenerating zones closely coupled in a compact unitary contacting unit.

Another object of the improved operation is the utilization of a fluid stream concomitantly for the elevation of catalyst from a catalyst reconditioning or regeneration zone to the top portion of an elevated reaction zone, for the control of the temperature of the catalyst being supplied to the reaction zone, and for the dilution of the fluid conversion products issuing from the reaction zone, and in a more specific aspect of this object the invention aims at an improved method for catalyzing the vapor phase exothermic conversion of hydrocarbons at high temperature.

It also is an object of the invention to provide a process permitting the conversion of hydrocarbonaceous reactant substantially solely during its contact with catalyst particles traveling downwardly through the reaction zone in a state of dispersion in the reactant therein with completion of the catalyst cycle by passage of the particles substantially by gravity in a dense bed through the reconditioning or regenerating zone and then by the lifting action of a transporting fluid through a return path to the top portion of the reaction zone and into contact therein with the reactant.

Other objects and advantages of the improved operation of this invention will become apparent from the subsequent description.

The present invention in its principal aspects, provides a process for effecting the catalytic conversion of a hydrocarbonaceous reactant stream wherein a descending bed of finely divided solid catalyst particles is maintained in a stripping zone subjacent to and openly communicating with a reaction zone, a stream of catalyst particles is withdrawn downwardly from the lower portion of the stripping zone and subsequently commingled with a stream of transporting fluid, the resulting mixture is directed upwardly as a suspension in a confined path constituting substantially the sole passageway for introducing catalyst into the reaction zone and extending upwardly through the descending bed and through at least a major portion of the reaction zone into the top portion of the latter, the suspension is laterally expanded and the catalyst particles thereof are dispersed from the upper end of the confined path into the top portion of the reaction zone, the dispersed catalyst particles are passed downwardly through the reaction zone in countercurrent contact with hydrocarbonaceous reactant continuously supplied to the lower portion of the reaction zone, throughout this reaction zone a catalyst particle concentration is maintained which is lower than that in both the descending bed and the suspension in the confined path, the reactant is subjected to conversion during its contact with the catalyst particles dispersed therein, a resulting fluid product stream and the transporting fluid are separated from the dispersed catalyst particles in the upper end portion of the reaction zone and withdrawn therefrom as a mixed stream, the contacted catalyst particles are gravitated from the reaction zone into the descending bed and into countercurrent contact therein with a stripping fluid, and used stripping fluid is disengaged upwardly from the dense bed into admixture with the hydrocarbonaceous reactant being passed upwardly through the reaction zone.

The hydrocarbonaceous reactant in the principal embodiment of this invention is passed through the reaction zone in a direction assuring a substantially streamline or unidirectional downward travel of the dispersed catalyst particles through this zone. The reactant is passed through the reaction zone in a generally vertical direction and at a velocity of flow at which the falling or settling of the dispersed particles is hindered only moderately and insufficiently to cause turbulent agitation of the particles upon their discharge from the confined transfer path and dispersal into the top portion of the reaction zone, and this unidirectional flow of the particles is thus maintained throughout the predominant portion of the height of the reaction zone, that is to say, from an elevation about equal to that of the discharge end of the confined transfer path down to the immediate proximity of the top of the descending bed in the stripping or reconditioning zone subjacent the reaction zone. In a preferred mode of realizing the unidirectional particle descent the hydrocarbonaceous reactant is introduced into the lower end portion of the reaction zone through a suitable distributing means above the stripping zone (that is to say, without passing through the descending bed) and is passed vertically upwardly through the reaction zone in countercurrent flow to and intimate contact with the descending dispersed catalyst particles therein.

In a specific embodiment the present process comprises passing dispersed finely divided solid catalyst particles from the upper portion of a vertically elongated reaction zone downwardly therethrough in dispersed state and substantially unidirectional flow countercurrently to and in contact with a hydrocarbonaceous reactant introduced into the lower portion of the reaction zone, subjecting the reactant to conversion during the countercurrent contact with the dispersed catalyst particles, gravitating the contacted catalyst particles from the reaction zone into a descending dense bed thereof maintained in a catalyst stripping zone subjacent to and in unrestricted communication with the reaction zone, passing a stripping fluid countercurrently through the descending bed, withdrawing catalyst particles from the lower portion of the descending bed, commingling a stream of the withdrawn particles with a stream of transporting fluid to form a suspension, passing this suspension through a confined path extending upwardly through the dense bed and through at least a major portion of the reaction zone to within the top portion of the latter and maintaining the suspension within this path at a particle concentration which is greater than that prevailing in the reaction zone and smaller than that in the descending bed, discharging and laterally expanding the suspension from the confined path to continuously disperse the catalyst particles and simultaneously separating transporting fluid, fluid conversion products and stripping fluid from the dispersed particles in the top portion of the reaction zone and withdrawing the resultant fluid mixture continuously from the latter.

For the performance of catalytic conversion of hydrocarbonaceous reactants wherein combustible contaminants accumulate on the catalyst particles leaving the reaction zone, provision is made in the process of this invention for oxidative regeneration of the catalyst particles in a descending bed within a confined lower contacting zone disposed in vertical alignment with the reaction zone and with the stripping zone subjacent to and in open communication with the latter in such manner that stripped catalyst particles still contaminated by combustible deposits are passed downwardly from the stripping zone into the bed in the confined lower zone and into contact therein with an oxidizing gas, regenerated catalyst particles are withdrawn downwardly from the lower portion of the lower contacting zone and then commingled with the stream of transporting fluid, the mixture is passed upwardly in a confined path extending through the descending beds in the lower zone and the stripping zone and through at least a major portion of the reaction zone, the mixture is discharged and laterally expanded from the upper end of the confined path and dispersed into the upper portion of the reaction zone wherein the hydrocarbonaceous reactant is contacted with the dispersed catalyst particles, and contaminated catalyst particles are gravitated from the reaction zone into countercurrent contact with stripping fluid passing upwardly through the dense particle bed in the stripping zone, transporting fluid, fluid conversion products and stripping fluid are continuously withdrawn in commingled state from the reaction zone and the gaseous oxidation products formed in the lower contacting zone are removed therefrom as a separate stream.

In a typical embodiment of the present process the aforementioned stripping fluid is a gasiform medium which expels adsorbed hydrocarbonaceous reactant and volatilizable reaction products from the contacted catalyst particles and does not react with the reactant undergoing conversion in the reaction zone but acts as a diluent for the latter. In another specific embodiment, fluid inorganic reactant is first passed as stripping fluid upwardly through the descending bed of catalyst particles and then commingled with the stream of fluid hydrocarbonaceous reactant separately introduced into the lower portion of the reaction zone and interreaction of the two reactants is effected in the reaction zone while they travel upwardly therethrough in contact with the catalyst particles dispersed therein. In general, a fluid which is unreactive with the reaction products under the conditions prevailing in the reaction zone is employed as the aforesaid transporting fluid for supplying catalyst particles through the confined path to the upper portion of the reaction zone. Thus, steam, nitrogen, hydrogen, carbon dioxide, combustion gases and the like gasiform materials and mixtures of several of these materials come into consideration as catalyst transporting media. Also a normally gaseous byproduct fraction separated from the products of the process may be used, after appropriate temperature adjustment, for transporting the catalyst particles through the confined path to the top portion of the reaction zone. The stripping fluid may consist of or comprise hydrogen, carbon dioxide, carbon monoxide, oxygen, air, steam, nitrogen or the like, or a mixture of several of these materials. The proper selection of the stripping fluid is necessarily made with due regard to the nature of the hydrocarbonaceous reactant undergoing conversion and of the reaction to be performed.

In all embodiments of the process in accordance with the present invention, practically the entire quantity of the catalyst which is to be supplied to the reaction zone during the operation of the process is introduced thereto by way of the suspension passing upwardly through the confined path, which preferably is a vertical straight line path extending centrally through the superimposed zones employed in the process and terminating wtihin or in the immediate proximity of the upper end portion of the reaction zone. Thus the catalyst is introduced into the reaction zone substantially only at the top portion of the latter and in such manner that the catalyst particles are dispersed and then travel downwardly through substantially the entire height of the reaction zone in a dispersed state. Material variation in the residence time of different catalyst particles, such as is encountered in turbulent dense catalyst masses and so-called fluidized dense phase beds and in operations wherein catalyst particles are maintained in motion along several opposing or intersecting paths of travel, is precluded by the unidirectional passage of the catalyst particles through the reaction zone, and an unusual uniformity of contact between reactant and catalyst in the reaction zone is thus assured.

A particular advantage of the present process is that it permits the conversion in the reaction zone in a manner precluding contact of partially converted reactant with a compact catalyst bed so that a more accurate control over the reaction time and extent and uniformity of conversion is attained and the operational difficulties of separating the fluid conversion products from a compact catalyst bed are eliminated. While the depth of the dense bed in the stripping zone of this process may be varied to suit the particular operation being practiced, the upper level of this bed is maintained throughout the operation below the level at which the fluid hydrocarbonaceous reactant and the stripping fluid disengaged upwardly from this bed are commingled. The stripping fluid disengaging from the upper level of the dense bed in the stripping zone cushions the impact of the descending particles onto the surface of this bed and thereby assists in maintaining attrition of catalyst particles at a minimum.

The principal conditions such as time, temperature and pressure, governing the conversion of hydrocarbonaceous reactants in the presence of solid catalysts and the regeneration of such catalysts, are now well known to the chemical and petroleum arts and need not be described in detail herein. The catalysts utilizable in the present process generally are those which are capable of regeneration upon contamination or inactivation during the conversion of the reactant and which substantially retain their solid subdivided state under the conditions to which they are exposed. The catalyst used may be in either the so-called powdered form or in a specially prepared spherodial form, and the latter form of catalyst is preferred because of its generally greater ease of fluidization and lesser tendency of causing erosion of the apparatus in which it is used.

The type of catalyst used will of course depend upon the type of conversion to be catalyzed. The present method of operation is applicable to the catalytic conversion of hydrocarbon charging stocks, such as the dehydrogenation of hydrocarbons into the corresponding hydrocarbons of lower hydrogen content, the reforming of naphthas and gasoline fractions for the improvement of their motor fuel values, the aromatization of liquid hydrocarbon oil fractions initially low in aromatic content, the production primarily of olefinic liquid fractions of kerosene boiling characteristics from substantially paraffinic charging stocks of higher boiling characteristics, including paraffin wax fractions, the production of oxygenated derivatives of hydrocarbons by controled catalytic oxidation with an oxidizing gas such as the production of phthalic acid or phthalic anhydride from naphthalene or ortho xylene, the selective hydrogeneration or partial hydrogenation of unsaturated hydrocarbons, and the dealkylation of alkyl-aromatic hydrocarbons, more particularly of mono- or poly-alkylated hydrocarbons in which at least one alkyl group contains two or more carbon atoms, in the presence of hydrogen (or a hydrogen donor such as a naphthane) to form mono- or poly-methylated aromatic hydrocarbons, such as the production of toluene from ethyl-, propyl- or butylbenzene. For each of these hydrocarbon conversion reactions, appropriate solid catalysts are available in the art and need not be described here in detail. Preference is given in the present method to those of the various catalysts which are highly refractory and capable of regeneration by treatment with an oxidizing gas stream at temperatures at which carbonaceous contaminants are burned from the used catalyst and simultaneously therewith the activity is substantially restored. While activated natural composites of the type of activated montmorillonite and similar clays may be used as catalyst in some cases, synthetically prepared composites comprising an oxidic base or carrier of relatively low activity and at least one metal compound as promoter or component of higher activity, such as for example the synthetic composites of silica with magnesia or with one or more of the oxides of aluminum and zirconium, are preferred for catalyzing hydrocarbon cracking reactions, and the composites of alumina or magnesia with oxides of chromium, molybdenum, or vanadium, or with certain other metal oxides, suitable for use in the hydrocarbon reforming, aromatization, dehydrogenation, hydrogenation and dealkylation reactions contemplated herein.

While the present process is described in greater detail below primarily with reference to hydrocarbon conversion reactions, it is realized that with suitable adjustments in the operating conditions of temperature and time it may be applied advantageously also to other organic reactions, such as for example, the catalytic dehydration or controlled dehydrogenation of oxygenated hydrocarbon compounds. Among the reactions contemplated and performable at elevated temperatures with refractory catalysts, capable of regeneration by treatment with oxidizing gases, the following are typical: Vapor-phase dehydration of aliphatic alcohols to olefins in the presence of catalytic composites of silica with one or more of the compounds alumina, zirconia, thoria and blue oxide of tungsten; vapor-phase dehydration of phenols with similar catalysts such as the conversion of phenol to diphenyl oxide using an alumina-thoria or similarly effective composite catalyst; manufacture of ketones from the lower organic acids, especially of acetone from acetic acid, using a synthetic silica-alumina catalyst or a similar catalyst comprising as active component, one or more compounds of the group consisting of the oxides of aluminum, thorium, chromium and zinc; conversion of alcohols with steam into ketones over silica-thoria catalyst; and production of aliphatic amines by reaction of the corresponding alcohol vapor with ammonia in the presence of a silica-alumina catalyst.

The present process is particularly suitable for the performance of those of the foregoing reactions which require rather short contact times such as in the range of from 0.01 to 1 second, and also of those reactions wherein an organic reactant is converted in the presence of an inorganic fluid such as the aforementioned oxidizing gasses, hydrogen and steam. In applying the present process to the catalytic conversion of an organic reactant involving reaction of the latter with a fluid inorganic reactant it is frequently preferable that all or at least a portion of the inorganic reactant be employed as stripping medium for reconditioning the catalyst particles in the descending bed in the stripping zone with introduction of the organic reactant and the balance, if any, of the inorganic reactant to the bottom portion of the reaction zone through separate passageways or distributing means.

In all of the modes of application referred to, the solid catalyst particles are transported, in the present process, from the lower portion of the catalyst regenerating zone or the catalyst stripping zone, respectively, as a suspension with a suitable transporting fluid stream to the upper portion of the reaction zone and thereafter pass downwardly within this reaction zone in a state of dilute dispersion and mechanically unimpeded settling during their countercurrent contact with the reactant stream, while, in the stripping zone subjacent to and in open communication with the reaction zone, and also in the regenerating zone, when the latter is employed in conjunction with the stripping zone, the particles are contacted as a descending dense bed with a stream of stripping or regenerating medium. Thus the catalyst particles must be of such size that they can be continuously circulated within the unit without the aid of mechanical conveying means and they must be of such size as to permit the lifting of the particles through an internal conduit without the necessity of such excessive velocity of the ascending fluid as would give rise to erosion of the riser or transfer conduit defining the upward confined path, or undue attrition of the solid particles. Generally, catalyst particles of less than 2 mm. diameter should be used; spheroidal particles of between 0.01 and 0.8 mm. diameter are preferred.

A particularly advantageous feature of the present method of operation, is that it is adapted to perform not only endothermic conversions but also highly exothermic reactions of hydrocarbonaceous reactants. In the performance of the latter type of reactions, and also in operations involving oxidative regeneration of catalyst contaminated by combustible deposits formed during the conversion reaction, a transporting fluid may be sprayed or otherwise introduced at least partly in the liquid or liquefied state into the lower end of an internal transfer or riser conduit, at the point where the catalyst particles are withdrawn from the catalyst stripping or regenerating zone with a greater heat content than desired in the reaction zone. The hot catalyst particles mixing with the stream of transporting fluid vaporize the liquid part of the latter and are then carried to the upper end of the reaction zone as a suspension in the vaporous transporting fluid. In any event a controllable amount of excess heat of reaction or regeneration absorbed by the catalyst during its downward travel through the system is advantageously dissipated during its return to the top portion of the reaction zone in a manner imparting a uniform temperature to the catalyst particles reaching the reaction zone. Conversely, in the performance of an endothermic conversion of hydrocarbonaceous reactant, heat required for the reaction can be imparted uniformly to all catalyst particles entering the reaction zone by elevating them through the confined path with the aid of an appropriately preheated transporting fluid.

The arrangement of the apparatus portions confining the several contacting zones, and of the transfer and control means of the present invention are such that an efficient compact unitary apparatus is provided to carry out the improved operation. The structural parts and arrangement of the apparatus in accordance with the invention are principally the following: A vertically elongated shell houses an upper particle separating section, an intermediate elongated contacting or reaction section and a lower stripping section in vertical alignment and substantially unrestricted communication with each other. The stripping section is adapted to contain a bed of solid particles. Inlet means are provided at the lower end portion of the elongated contacting section for introducing fluid reactant to this section, these inlet means being preferably in the form of a peripheral or annular distributing header. The particle separating or vapor collecting section is provided at its top portion with vapor outlet means to permit withdrawing vaporous fluid and discharging the same from the shell. In its preferred form, this separating section is arranged immediately on top of the elongated contacting section without any constriction between these two sections and with a free cross-section area which is substantially larger than, generally more than twice as large as, that of the elongated contacting section. The stripping section, in its preferred form extends downwardly from the elongated contacting section without any constriction therebetween and has a free cross-sectional area which is at least as large as, and more commonly larger than, that of the elongated contacting section. A discharge well for solid particles extends downwardly from the lower portion of the elongated shell. A vertical conduit communicates at its lower end with the lower portion of the discharge well and extends from below the stripping section centrally through the latter and through at least the major portion of the height of the elongated contacting section, and this vertical conduit is open at its upper end in proximity of the convergence of the separating section and the elongated reaction section. The discharge well has a vertical confining wall cylindrically spaced around the lower portion of the vertical conduit so as to define an annular passageway of substantially smaller cross-section than the elongated contacting section so as to permit withdrawal of solid particles from the lower section as a descending annular column along and around the lower portion of the vertical conduit. Fluid inlet means are arranged at the lower portion of the discharge well to direct solid particles from the latter in admixture with a fluid stream into the vertical conduit and fluid inlet means are provided at the vertical cylindrical confining wall for introducing a fluid stripping medium to the annular passageway.

The apparatus always is provided with means for the stripping of entrained hydrocarbonaceous reactant and volatile conversion products from the catalyst particles in the dense bed thereof maintained in the stripping zone as already described. In an arrangement for accomplishing also oxidative regeneration of stripped catalyst in a separate confined regeneration zone, the preferred apparatus comprises an elongated shell in which a vertical conduit extends upwardly from below the bottom of the shell and terminates with an open end in the top portion of the shell and this shell is subdivided by a partition extending inwardly from the vertical wall of the shell toward an intermediate portion of the vertical conduit so as to divide the shell into an upper chamber portion containing the separating section, the elongated contacting section and the stripping section and into a lower chamber portion confining a lower contacting section which serves as regenerating zone. The partition is provided with a central opening around the riser conduit for the downward passage of solid particles between the riser conduit and the inner periphery of the partition. A wall member depends from the inner periphery of the partition into the lower chamber portion and is spaced from the vertical conduit to form with the latter an annular passageway for the transfer of particles downwardly from the stripping section into the lower contacting section. Inlet means for introducing a stripping fluid to this passageway are provided at an intermediate point in the height of the depending wall member. A discharge well for solid particles extends downwardly from the lower portion of the elongated shell and has a vertical confining wall cylindrically spaced around the lower portion of the vertical conduit so as to define an annular dischargeway of substantially smaller cross-section than that of the elongated contacting section so as to permit withdrawal of solid particles from the lower contacting section as a descending annular column along and around the lower portion of the vertical conduit. The vertical conduit communicates at its lower end with the discharge well, and a fluid inlet means is arranged at the lower portion of the discharge well to direct solid particles from the latter in admixture with a fluid stream into the vertical conduit. Fluid inlet and outlet means are provided at vertically spaced portions of the lower chamber portion. Preferably, fluid inlet means are provided also at an intermediate elevation of the vertical cylindrical confining wall for introducing a fluid stripping medium to the annular dischargeway.

A valve or other flow controlling means may be positioned at the lower end of the vertical conduit in order to aid in the control of the flow of particles from the lower discharge well into this transfer conduit. A valve or other flow controlling means is usually provided in the means for introducing stripping fluid into the annular passageway extending downwardly from the stripping section so that the rate of supply of stripping fluid to the relatively compact bed in the stripping section may be controlled.

The arrangement of the transfer conduit and of the annular passageways for withdrawal of solid particles from each of the stripping sections and the lower contacting section constitute advantageous features of the system. The catalyst particles are withdrawn from each of these sections in elongated annular columns suitable for efficient stripping of the particles by a countercurrently upwardly flowing stripping stream of steam, flue gas, or other suitable gaseous medium. At the upper annular passageway the hot catalyst-containing stream passing upwardly in the transfer conduit is in indirect heat exchange with the particles descending in the annular column, and a relatively high temperature stripping and sealing zone is thus maintained and the stripping of vaporous or gaseous materials from the solid particles accomplished in the descending dense bed in the stripping section is enhanced in a highly effective manner by supplemental stripping in this annular column. A similar stripping action is secured in the lower discharge well with the aid of a stripping medium supplied at appropriate temperature. The lower portion of the vertical riser conduit is positioned within the regenerating zone where oxidation of carbonaceous material on the solid particles imparts a relatively high temperature to the wall of the conduit whereby heat is supplied to the material passing upwardly through this conduit. As above noted, this heat exchange arrangement is of particular advantage for the dissipation of excess heat by a catalyst transporting fluid supplied partly or entirely in the liquid state at the point of mixing with the hot catalyst stream; undue cooling of the hot catalyst stream issuing from the lower discharge well by abstraction of the heat of vaporization of the transporting medium is counteracted by the heat transfer through the wall of that portion of the riser conduit which is enveloped by the regenerating zone and the latter heat transfer aids in preserving in the ascending stream in the conduit the amount of heat desired for the endothermic reaction in the elongated contacting or reaction zone.

The accompanying drawing illustrates a diagrammatic elevational view of two contacting units as provided by the invention and suitable for practicing the method of the present invention, and the following description thereof will aid in showing the improved flow through the units, as well as point out further advantageous features of the operation.

Figure 1 of the drawing illustrates an apparatus suitable for the catalytic conversion of hydrocarbonaceous reactants with concomitant oxidative regeneration of the catalyst outside of the reaction and stripping zones, while Figure 2 of the drawing illustrates a modified apparatus suitable for the catalytic conversion of hydrocarbonaceous reactants obviating a separate oxidative catalyst regeneration.

Figures 1, 2:
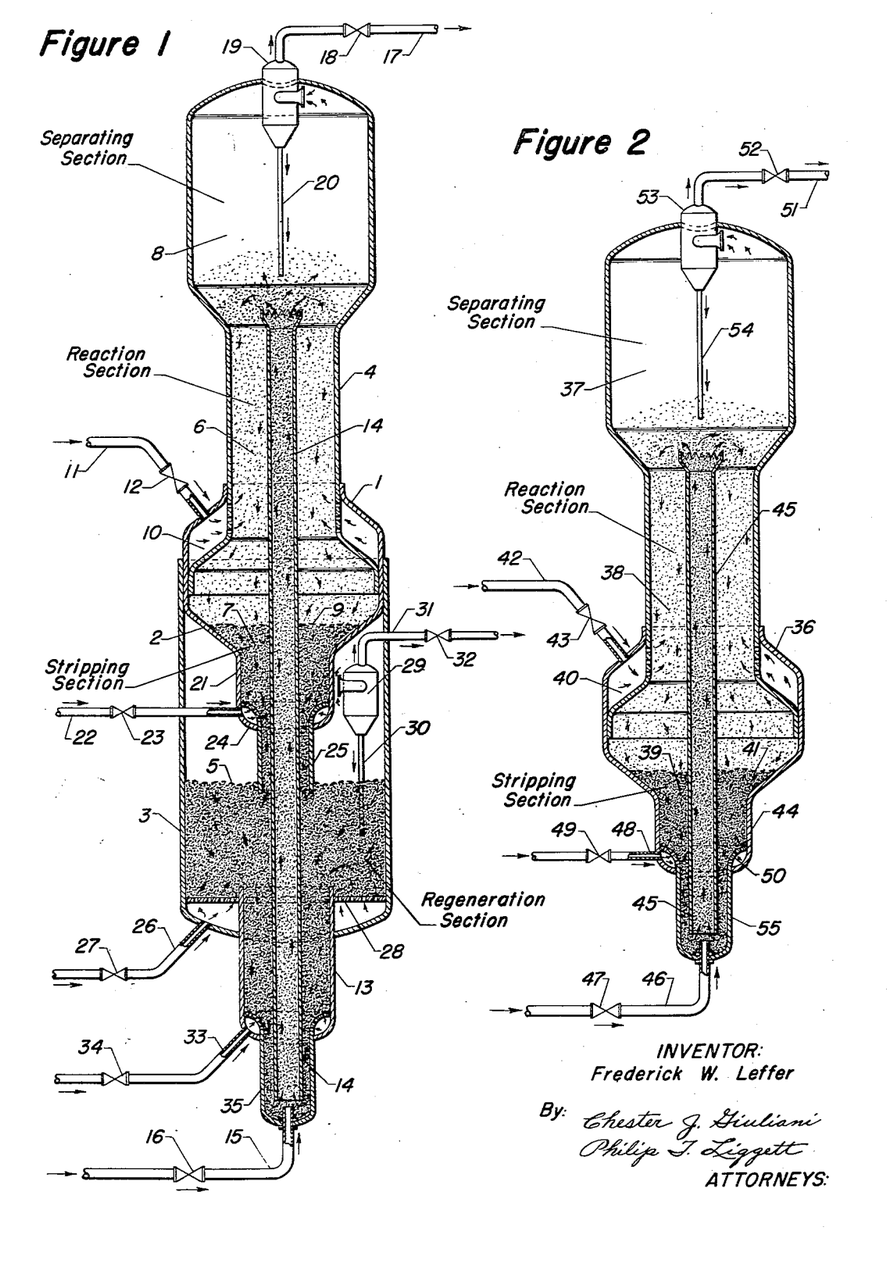

Referring now to Figure 1 of the drawing, there is shown an elongated shell 1 having a partition wall 2 which divides the shell into a lower contacting chamber 3 and an upper chamber 4. The lower chamber 3 is adapted to serve as regeneration section and to accommodate a descending dense bed of catalyst particles, the top of this bed being indicated by the broken line 5. The upper chamber comprises the elongated contacting or reaction section 6, the stripping section 7 subjacent to and openly communicating with the reaction section, and the particle separating and vapor collecting section 8 superimposed on and in open communication with the reaction section. The stripping section 7 is adapted to contain a descending dense bed of solid particles, the top of this bed being indicated by the broken line 9. A fluid inlet means or distributing header 10 also is arranged within the elongated shell 1 so as to communicate with the lower end portion of the reaction section 6 and permit the introduction of fluid into this section along the lower periphery of the latter.

For the purpose of simplification, the apparatus will be described with reference to a butene dehydrogenation operation. Thus, in the arrangement of Figure 1, the hydrocarbon charge to be reacted during contact with the catalyst is supplied to the unit through line 11 and control valve 12 in vaporized state at approximately reaction temperature and is distributed through the annular header 10 into the vertically elongated contacting section 6. Freshly regenerated and reactivated dehydrogenation catalyst particles (magnesia supporting minor proportions of iron oxide, copper oxide and potassium oxide) having an apparent bulk density of about 39 pounds per cubic foot and a size of substantially from 0.1 to 0.8 mm. diameter are withdrawn from the lower portion of the regeneration section 3 and pass downwardly through the withdrawal well 13 to the lower end of the transfer conduit 14 where they are commingled with a preheated stream of fluid transporting medium supplied through line 15 and valve 16 at a temperature somewhat below the dehydrogenation temperature. The fluid transporting medium in this particular operation is advantageously steam which after its discharge from the transfer conduit 14 acts as diluent for the reaction products. A sliding member or other valve controlling means (not shown) may be provided at the lower end of the transfer conduit 14 to regulate the flow of catalyst particles into the lower end thereof. The catalyst particles are transferred by the stream of transporting medium as a suspension upwardly through the vertical riser conduit 14, wherein excess heat generated in the regeneration section is dissipated by the transporting medium and also by indirect transfer of heat to the reaction zone, into the separating section 8 within the upper chamber 4 wherein the mixed stream is expanded and the catalyst particles are thereby dispersed and permitted to descend through the reaction section 6 in dispersed state in countercurrent contact with the reactant stream supplied to the lower end portion of this section so that the dehydrogenation reaction is performed in the section 6 at a temperature of about 640° C. and a hydrocarbon partial pressure of approximately 80 mm. Hg absolute during a contact time of 0.9 second. In this operation the catalyst suspension within the vertical transfer conduit 14 is maintained at a density of about 21 pounds per cubic foot while the disperse phase in the reaction section 6 is maintained at a density of about 1.8 pounds per cubic foot. The lateral expansion of the effluent and the dispersion of the particles from the riser conduit through the lower portion of the separating section 8 into the top portion of the reaction section 6 is assured by providing both the separating section and the reaction section with a free cross-sectional area which is materially larger than that of the riser conduit 14 and by providing the separating section with a larger free cross-sectional area than the reaction section. The ratio of the cross-sectional area of the reaction section to that of the riser conduit generally is at least 10:1 and more commonly is within the range of from 15:1 to 50:1.

The vaporous conversion products are withdrawn from the upper portion of the disperse phase through the particle separating and vapor collecting section 8, which permits the separation and withdrawal of vaporous products from the dispersed particles without entraining any substantial amount of the solid material. In section 8, moreover, the catalyst transporting medium discharged from conduit 14 is commingled with the vaporous dehydrogenation products during the separation of the catalyst particles therefrom, and the resultant gasiform mixture is removed through line 17 and control valve 18 from the shell 1 to suitable cooling and fractionation facilities (not shown) for the separation and recovery of the butadiene produced. Effective separation of the vaporous and gaseous materials from the dispersed catalyst particles is brought about by providing the separating section 8 with a sufficiently large cross-sectional area (for most operations appreciably more than twice that of the reaction section 6) and with a height about equal to the diameter of the section 8; thus, the upflow velocity of the mixed vaporous and gaseous materials in this section 8 is appreciably less than the upflow velocity of the gasiform material in the reaction section 6, so that at least the bulk of catalyst particles gravitates from the dispersed effluent of conduit 14 before the gasiform component of this effluent and the vaporous reaction products reach line 17. If so desired, a centrifugal particle separator 19 may be provided at the inlet end of line 17 to aid in substantially complete separation of solid particles from the gas-vapor mixture before the latter is withdrawn through line 17. Separated particles are in such case returned from separator 19 through dip leg 20 for redispersal and further use. The dip leg is provided with a check valve (not shown) permitting only downflow of particles therethrough.

The contaminated contacted catalyst particles pass in dispersed state downwardly from the reaction section 6 by gravity beyond the annular distributing header 10 and are then collected in the dense bed in the stripping section 7. The bed in this section is maintained at a density of approximately 34 pounds per cubic foot. Particles are withdrawn from the lower end of the stripping section 7 through an elongated discharge well 21, which in this embodiment provides an annular column of particles passing downwardly around the internal conduit 14. Preferably, the withdrawal well 21 also provides a stripping zone for supplementing the removal of adsorbed and occluded vaporous reactant and conversion products from the catalyst particles prior to their discharge into the lower chamber 3 constituting the catalyst regenerating section. A suitable stripping medium is passed into an intermediate elevation of the discharge well 21 and upwardly therethrough into the lower end of the stripping section 7 by way of line 22 and control valve 23. Steam, nitrogen, flue gas and other similarly inert media are generally suitable for this purpose, although in the dehydrogenation of butene as here illustrated, superheated steam is preferred for the dual purpose of stripping and of reducing the hydrocarbon partial presure in the reaction section. Uniform distribution of the stripping medium may be assured by a suitable distributing header at the discharge end of line 22, such as a perforated ring 24. The stripping medium and stripped vaporous material disengage upwardly from the dense bed in the stripping section 7 and thereupon commingle with the fluid reactant supplied through header 10, the commingled materials being then passed upwardly through the reaction section 6. In operations, such as that of the present example, where the stripping medium is insufficient in quantity to provide adequate dilution of the reactant, additional diluent may be supplied through line 11 together with the reactant. Thus, in the present butene dehydrogenation operation, superheated steam is admitted through line 11 and header 10 at a rate at which the total pressure in the reaction section 6 is maintained at slightly above atmospheric pressure.

The transfer of the contaminated catalyst particles from the stripping section 7 to the lower regeneration section is made through a suitably restricted lower portion 25 of the discharge well 21, this lower portion or sleeve 25 extending downwardly into the upper portion of the regeneration section 3 and into the top of the descending bed in the latter. The rate of discharge of the solid particles from the discharge well 21 is controlled by the control of the upper level 5 of the bed in the section 3, and this control, in turn, provides means for regulating the depth of the descending bed of particles maintained within the stripping section 7. The depth of the latter bed may be varied to suit the stripping requirement arising in a given conversion operation. Thus, the level 9 of the bed in the stripping section 7 may be maintained at any desired height below the reactant distributing header 10, and therefore below the lower edge of the internal wall portion of the reaction section 6 of the illustrated apparatus, and above the point of introduction of the stripping medium into the compact mass of particles to be stripped. The height and the cross-sectional area of the lower portion 25 of the discharge well 21 are advantageously such that a small yet definite portion of the stripping medium supplied by line 22 is permitted to pass downwardly with the descending particles through the well portion 25 and the access of gasiform material from the regeneration section 3 to the stripping section 7 and reaction section 6 is thereby precluded.

In the regeneration section 3, provision is made to contact the catalyst particles in a descending dense bed with a regenerating gas being charged to the lower end of section 3 through line 26 having a control valve 27. The regenerating gas may be air or another free oxygen-containing gas stream suitable to burn and remove the carbonaceous deposits which contaminate the catalyst particles charged thereto. In the operation of the present example the regeneration is effected in the descending particle bed in section 3 at an average temperature of about 655° C. and a pressure slightly above atmospheric pressure. Preferably, as illustrated in this embodiment, a distributing grid 28, or baffles, are provided at the lower end of the contacting zone to distribute the regenerating gas into the descending particle bed and to thus insure substantially uniform regeneration of the catalyst, while the bed in this regeneration section is maintained at a density of about 32 pounds per cubic foot. Combustion gases formed by the burning and oxidizing operation, and disengaging upwardly from the bed in section 3 are discharged from the upper end of the lower chamber portion through a particle separator 29, which may be of a mechanical or centrifugal type suitable to remove finely divided solid catalyst particles from the outgoing stream. Recovered solid particles are returned to the dense bed in the lower chamber portion through dip leg 30, while the flue gas stream, substantially free of particles, is discharged from the upper end of the lower chamber portion through outlet conduit 31 having a control valve 32. If so desired, the countercurrent contact of the regenerating gas and descending catalyst particles may be aided by a number of vertically spaced substantially horizontal grids or perforated plates in the dense bed above the distributing grid 28.

The discharge of reactivated and regenerated particles from the regeneration section 3 is effected by means of the discharge well 13 at the lower end of the elongated shell 1. This discharge well forms a seal between the regenerating gas atmosphere within the lower chamber portion 3 and the transporting fluid admitted to the system through line 15. As in the upper withdrawal well, the regenerated catalyst particles pass downwardly within the well 13 around the lower end of the internal transfer or riser conduit 14 such that the particles are in a descending annular column providing a uniform withdrawal from the regeneration section and their substantially uniform introduction into the lower end of conduit 14. The elongated annular column of particles also provides means for effecting an efficient stripping of the particles to remove entrained free oxygen-containing gas prior to their entering the transfer conduit. Steam or other suitable stripping medium such as for example a portion of hot flue gas, substantially devoid of free oxygen, from the line 31, may be charged to the lower withdrawal well 13 at an intermediate height thereof through line 33 having a control valve 34. The lower end portion 35 of the well 13 is advantageously more restricted than the upper or stripping portion of this well.

During a normal continuous operation applied in the described unit to a given conversion charge under substantially constant conditions of operation the quantity of catalyst in the system does not change materially. The catalyst concentration, however, varies appreciably between the principal zones or sections of the system. Thus, when expressing catalyst particle concentration as density of the respective mixtures of solid and fluid materials in the several zones, the suspension ascending in the confined transfer path or riser conduit is maintained as a density which is always at least 3 times as large, and may be as much as 50 times as large as that of the dispersed phase in the reaction zone while the descending bed in the stripping zone subjacent the reaction zone always is at least 1.5 as large as the density of the suspension in the riser conduit. The descending bed in the regeneration zone subjacent the stripping zone is maintained at approximately the same or a somewhat smaller density than that of the bed within this stripping zone. Relative to the apparent bulk density of the catalyst in use in the process, taken as 100%, the catalyst concentration in the several zones of the process is suitably within the limits of the following ranges, particularly when the catalyst particle size is in the preferred range of 0.01–0.8 mm.:

|  | Percent |
|---|---|
| Suspension in the riser conduit | 17.5– 60 |
| Dispersed phase in the reaction zone | 2– 5 |
| Descending bed in the stripping zone | 65–100 |
| Descending bed in the regeneration zone | 60–100 |

Minute amounts of catalyst fines may be carried away with the stream of reaction products withdrawn through line 17 and valve 18 and catalyst thus removed from the system may be separated from the reaction products in any suitable manner and either discarded or returned to the system. In many instances, the separator 19 may be omitted and the catalyst carried in the stream withdrawn through line 17 in the form of extremely fine particles may not be desired in the unit, and they are in such case not returned thereto. Make-up quantities of catalyst compensating for this catalyst loss may be introduced to the system from time to time, preferably through a catalyst feeding and withdrawal conduit arranged to communicate with the dense bed in the lower chamber portion 3. Such conduit is also desirable for adjusting, whenever required, the quantity of catalyst contained in the system, and for thereby permitting adjustment of the level of the relatively compact bed in the stripping section 7 without materially affecting the level of the descending dense bed in the lower chamber portion 3.

In the operation described for illustrating the utility of the present invention with reference to a unit of the type shown in Figure 1, a temperature advantage is gained through heat transfer from the interior of the regenerating zone and the lower portion of the conduit 14 which extends upwardly through that zone. Thus, through this heat exchange arrangement heat loss from the regenerated catalyst to the exterior of the system is precluded and, without subjecting the catalyst to an unduly high temperature during the oxidation treatment within the regenerating zone, the endothermic heat of reaction is transferred by the regenerated particles to the reaction zone. The reaction heat is introduced into the reaction section 6 largely by the particles entering this section upon their discharge from the conduit 14, while at the same time some of the reaction heat is transferred by indirect heat exchange through the wall of the transfer conduit portion extending upwardly through the reaction section 6. The amount of heat supplied to the reaction zone in this manner is closely controlled within desirable limits by adjusting the temperature of the fluid transporting medium, excess heat content of the regenerated particles being dissipated, for example, by commingling them with a transporting medium of controlled lower temperature.

The stripping medium supplied to the stripping section 7 is introduced through line 22 and distributor 24 continuously and at a pressure exceeding the substantially balanced fluid pressure above and below the discharge well 21 so that the gaseous regeneration products are precluded from entering the well 21 and the stripping zone above the latter.

The arrangement of the unit and the flow of the present invention is as hereinbefore noted, particularly adapted to carry out high temperature conversion operations including an oxidative catalyst regeneration step. Although not illustrated in the drawing, it is contemplated that a cooling coil or other cooling means may be incorporated in the lower portion of the regenerating section 3 in order to dissipate excess heat of regeneration not required in the conduit 14 and reaction section 6. It is further contemplated that cooling means be provided either in the top portion of the separating section 8 or in the withdrawal conduit 17 in order that the fluid conversion products may be subjected to a quench or rapid temperature reduction promptly upon their separation from the catalyst particles. Thus, in a preferred mode of operation the hydrocarbon conversion products are quenched by direct injection of a liquid cooling medium, such as water or a refractory oil, into the stream of vaporous conversion products passing through line 17.

The catalytic conversion method of the present invention is of course not limited to hydrocarbon conversion operations since it is adaptable to many processes converting organic materials. When several reactants participate in the desired conversion reaction they may be introduced in admixture with each other through the supply line 11 or separately from each other through several such supply lines with individual control valves, to thereafter commingle in the distributing annulus 10. In certain operations, however, and particularly in operations requiring rather short contact times for the performance of the desired reaction, line 11 may be used for introducing the hydrocarbonaceous reactant into the reaction zone while another reactant, capable of acting also as catalyst stripping medium, is supplied thereto by way of line 22 and the descending bed in the stripping section 7, preferably in such manner that this other reactant is heated to approximately reaction temperature during its upward passage through the descending bed in the stripping section and the catalyst particles are partially cooled on their way to the regeneration section.

Uniform dispersion of the catalyst particles issuing from the riser conduit 14 may be aided, if so desired, by providing this conduit with a flared discharge end having a serrated periphery, or by providing a distributing screen or grid (not shown) near the top portion of reaction section 6 at an elevation immediately below the discharge end of conduit 14, or by providing both of these means.

Referring now to Figure 2 of the drawing, there is shown a vertically elongated shell 36 housing the upper separating section 37, the elongated reaction section 38, the lower stripping or catalyst reconditioning section 39, and the annular distributing header 40. The reaction section 38 and the stripping section 39 are in open communication with each other and with the separating section 37, the latter being constructed, arranged and dimensioned in relation to the subjacent reaction section substantially in the same manner as already described for the section 8 of Figure 1. The stripping section 39 is adapted to accommodate a descending dense or compact bed of solid particles, the upper level of this bed being indicated by the broken line 41. The header 40 is provided with a fluid inlet line 42 containing control valve 43.

The outer confining wall of the stripping section 39 forms the lower portion of the shell. A vertically elongated well 44 of smaller cross-sectional area than that of the stripping section 39 depends centrally from the latter. A vertical riser or transfer conduit 45 extends from near the bottom of the well 44 upwardly into the shell 36 and axially through the major portion of the latter to about the level of convergence or common boundary of section 37 and 38. A supply line 46, containing valve 47, is provided for the introduction of transporting fluid into the riser conduit 44. Line 48 and valve 49 therein serve the controlled introduction of stripping fluid into the well 44 and the stripping section 39 at an intermediate elevation of the well 44 by way of a suitable distributing device such as the perforated ring-shaped passageway 50. Line 51 and valve 52 are provided to permit the withdrawal of fluid products from the top portion of the separating section 37 and a mechanical or centrifugal particle separator may be provided at the inlet end of line 51, preferably within the upper portion of separating section 37, for the removal of entrained particles from the fluid products prior to withdrawal of the latter from section 37 and shell 36. Dip leg 54 containing a check valve (not shown) permits return of separated particles from the separator 53 to redispersion and further use in the system.

In the performance of catalyzed reactions in the apparatus described with reference to Figure 2, the hydrocarbonaceous reactant is supplied at a suitable temperature to the lower end of reaction section 38 through line 42 and distributing header or annulus 40 while the catalyst particles are supplied to the upper end portion of the reaction section through the riser conduit 45 with the aid of an appropriate fluid transporting and temperature controlling medium fed into the system through line 46. A catalyst stripping or reconditioning fluid is introduced to the system through line 48 and distributing ring 50 and this fluid may be one which remains unchanged during its subsequent passage upwardly and in admixture with the reactant through the reaction section, or it may be a material which participates in the reaction of the hydrocarbonaceous reactant.

In a preferred mode of performing exothermic reactions, particularly in the case of the catalyzed controlled oxidation of hydrocarbons in the vaporous phase, a substantially inert transporting fluid is supplied in liquid or liquefied state or as a gas through line 42 at a temperature which permits its vaporization or heating upon contacting the more highly heated catalyst particles admixed thereto in the lower restricted portion 55 of the well 44, the catalyst being thereby cooled and the temperature equalized in the resultant suspension ascending in the transfer conduit 45. This manner of supplying the transporting fluid assures the dissipation of a substantial and readily controlled portion of the heat of exothermic reaction liberated in the reaction section 38 and partly carried by the catalyst particles therefrom to the well 44 and partly, although usually to a smaller extent, absorbed by the material within the transfer conduit 45 by indirect heat exchange; as the suspension reaches the discharge end of the transfer conduit the catalyst particles in the suspension are at a uniform temperature throughout, sufficient to initiate the reaction upon their dispersion and coming into countercurrent contact with the gasiform reactants in the reaction section. The hydrocarbonaceous reactant is introduced into the bottom portion of the reaction section through line 42 and header 40, and gaseous oxidizing agent is supplied at least in part, through line 48 and distributing means 50 to first serve as catalyst stripping and reconditioning medium in the stripping section 39 and to thereafter disengage upwardly from the descending bed in section 39 and commingle uniformly with the hydrocarbonaceous reactant distributed by the header 40. Additional oxidizing gas, not desired as stripping medium, may be supplied through line 42. The temperatures of the stream supplied through lines 42 and 48 are adjusted and controlled to maintain an optimum reaction temperature in the reaction section 38.

The effluent of the riser conduit 45 is laterally expanded in the bottom portion of the separating section 37 and the catalyst particles of this effluent are dispersed and then drop into and unidirectionally through the reaction section 38 in countercurrent contact with the vaporous or gaseous reactant passing upwardly therethrough and undergoing conversion therein. The resultant gasiform reaction products ascend from the reaction section into the separating section 37 and upwardly therethrough at an appreciably lower velocity of flow than the velocity of flow of the gasiform material in the reaction section. This reduction of flow velocity is brought about by the considerable enlargement, ordinarily more than two-fold, of the cross-sectional area of the section 37, relative to that of the reaction section 38, and is usually such that an effective particle separation is accomplished in the separating section which may obviate the need of mechanical particle separating devices, particularly when it is desired to continuously withdraw a minute portion of the catalyst in the form of fines from the system.

The contacted catalyst particles gravitate from the lower end portion of the reaction section onto the descending bed in the stripping section 39 and pass downwardly therein to the well 44 in countercurrent contact with a stripping fluid such as steam, residual gases separated from the fluid products of the process, or other gases which may be practically unreactive with the hydrocarbonaceous reactant and reaction products at the conditions prevailing in the reaction section or which may also participate in the conversion of the hydrocarbonaceous reactant and which in any event exert a beneficial effect on the used catalyst particles in the bed in section 39. Such stripping medium is supplied through line 48 at a pressure or rate adequate to force a major portion thereof upwardly through the descending bed without any material entrainment of particles therefrom into the reaction section, and to cause a minor portion of the stripping medium to pass downwardly with the catalyst particles into the lower well portion 55. The stripped catalyst substantially freed from adsorbed or occluded reactant and reaction products passes downwardly as an annular column to the inlet of the transfer conduit 45 through the passageway formed by the space between the outer cylindrical wall of the well portion 55 and the lower end portion of the transfer conduit 45. The stripping medium is supplied through line 48 advantageously at a temperature at which it has a controlling effect on the catalyst temperature, such that undue cooling or heating of the latter in the stripping section 39 and the well 44 is precluded. In the performance of exothermic reactions in the reaction section, a positive dissipation of heat from the catalyst particles is obtained readily in the stripping operation by supplying the stripping medium thereto at a controlled temperature below that of the reaction section, this heat dissipation being supplemental to and coordinated with the temperature control accomplished with the aid of the transporting medium supplied to conduit 45. The stripping medium and entrained stripped components disengaging from the upper level 41 of the bed in section 39 pass together with the gasiform reactant upwardly through the reaction section 38 into the separating section 37, the resultant mixture of gasiform products being withdrawn through line 51 to a suitable product fractionation or recovery system.

It is to be understood that the details of construction and operation described above with reference to the unit illustrated by Figure 1 apply also to the unit of Figure 2 to the extent that these two units are analogous to each other. It is to be understood particularly that in the conversion of hydrocarbonaceous reactants in the unit described with reference to Figure 2 of the drawing the concentrations of catalyst particles in the reaction section, the stripping section and the transfer or riser conduit bear the same principal relation to each other as described with reference to the corresponding sections and conduit of the unit of Figure 1 of the drawing.

In the construction of each of the units of Figures 1 and 2, it is not necessary to have any expansion joints for accommodating differential expansion between the conduit 14 or 45, on the one hand, and the shell 1 or 36, respectively, on the other hand since in each case the riser conduit is firmly attached to or supported by the shell structure in only a single plane. Conduit 14 of Figure 1 is supported in a manner free to expand vertically with changes in temperature, preferably by resting on the partition wall 2 by way of suitable means, such as for example three vertical flanges or ribs attached to the vertical conduit and spaced around the same equidistantly from each other, while guiding lugs or vertical guiding ribs are provided in proximity of the upper and lower end portions of the conduit to keep it centrally aligned in the shell structure. Similarly, the conduit 45 of Figure 2 may be supported by suitable means on that wall portion of the shell 36 which is provided substantially in the shape of an inverted truncated cone as bottom portion of the enlarged stripping section (enlarged relative to the reaction section), the conduit 45 being kept in axial alignment by suitable spacing bars or vertical fins near its upper end portion. It is not intended to limit the construction of the compact unitary apparatus to the exact proportions or structural details that have been shown and described. Obviously, the particle distributing means, particle separating means, and valves and the like may be varied to suit the particular purposes of the unit without departing from the scope of the invention.

I claim as my invention:

1. A process for catalytically converting a hydrocarbonaceous reactant which comprises maintaining a descending bed of subdivided solid catalyst particles in a stripping zone subjacent to and openly communicating with a reaction zone, withdrawing a stream of catalyst particles downwardly from the lower portion of the stripping zone and subsequently commingling the same with a stream of transporting fluid, directing the resulting mixture upwardly as a suspension in a confined path constituting substantially the sole passageway for introducing catalyst into the reaction zone and extending upwardly through said bed and through at least a major portion of said reaction zone into the top portion of the latter, laterally expanding said suspension and dispersing the catalyst particles thereof from the upper end of said confined path into said top portion of the reaction zone, passing the dispersed catalyst particles downwardly through said reaction zone in countercurrent contact with hydrocarbonaceous reactant, continuously supplying said reactant to the lower portion of said reaction zone at a higher elevation than said bed in the stripping zone and independently of said suspension in said confined path, maintaining throughout said reaction zone a lower catalyst particle concentration than in both said descending bed and said suspension within said confined path, converting said reactant during its countercurrent contact with the dispersed catalyst particles, separating a resulting fluid product stream and said transporting fluid from the dispersed catalyst particles in the upper end portion of said reaction zone and withdrawing the resulting mixed fluid stream therefrom, gravitating the contacted catalyst particles from said reaction zone into said descending bed and into countercurrent contact therein with a stripping fluid, and disengaging used stripping fluid upwardly from said bed into admixture with said hydrocarbonaceous reactant being passed upwardly through the reaction zone.

2. The process of claim 1, wherein the catalyst particle concentration throughout said reaction zone is maintained at less than one-third the average particle concentration of the suspension within said confined path and the particle concentration of said descending bed is maintained at least one and one-half times that of said suspension.

3. A process for catalytically converting hydrocarbonaceous reactants which comprises passing finely divided solid catalyst particles from the upper portion of a vertically elongated reaction zone downwardly therethrough in dispersed state and substantially unidirectional flow countercurrently to and in contact with a hydrocarbonaceous reactant, subjecting said reactant to conversion during said countercurrent contact with the dispersed catalyst particles, gravitating the contacted catalyst particles from said reaction zone into a descending bed thereof maintained in a catalyst stripping zone subjacent to and in open communication with said reaction zone, passing a stripping fluid countercurrently through said descending bed, withdrawing catalyst particles from the lower portion of said bed and commingling the withdrawn particles with a stream of transporting fluid to form a suspension, passing said suspension through a confined path extending upwardly through said bed and through at least a major portion of the reaction zone to within the upper end portion of the latter and maintaining said suspension within said confined path at a particle concentration which is greater than that prevailing in said reaction zone and smaller than that of said descending bed, introducing said hydrocarbonaceous reactant to the lower portion of the reaction zone at a higher elevation than said bed in the stripping zone and independently of said suspension in said confined path, discharging and laterally expanding said suspension from said confined path to continuously disperse said catalyst particles into the reaction zone and simultaneously separating transporting fluid, fluid conversion products and stripping fluid from the dispersed particles in said upper end portion of the reaction zone and withdrawing the resultant mixture of fluids continuously from the latter.

4. The process of claim 3, wherein the catalyst particle concentration throughout said reaction zone is maintained at less than one-third the average particle concentration of the suspension within said confined path and said descending bed is maintained at a particle concentration which is at least 1.5 times the particle concentration of said suspension.

5. The process of claim 3, wherein the catalyst particle concentration is maintained throughout said reaction zone at between 2 and 5 percent of the apparent bulk density of the catalyst circulating in the process.

6. The process of claim 3, wherein a stream of fluid exothermically reactive with said hydrocarbonaceous reactant is passed as said stripping fluid countercurrently through said descending bed and a fluid substantially unreactive with said fluid conversion products and having a lower temperature than that of the catalyst particles being withdrawn from said bed is commingled as heat dissipating and catalyst transporting fluid with said stream of withdrawn particles to form said suspension.

7. A process for catalytically converting hydrocarbonaceous reactants which comprises passing dispersed finely divided solid catalyst particles from an elevated separating zone downwardly into a subjacent elongated reaction zone of smaller free cross-sectional area than and in unrestricted communication with said separating zone, passing said dispersed catalyst particles downwardly through said reaction zone in substantially unidirectional flow countercurrently to and in contact with a fluid hydrocarbonaceous reactant, subjecting said reactant to conversion during the countercurrent contact with said dispersed particles, gravitating the contacted catalyst particles from said reaction zone into a subjacent stripping zone in unrestricted communication with said reaction zone and into a descending particle bed maintained in said stripping zone in countercurrent contact with a stripping fluid, withdrawing catalyst particles from the lower portion of said bed and said stripping zone, commingling a stream of the withdrawn particles with a stream of transporting fluid to form a suspension, passing said suspension through a confined path extending upwardly through said bed and through substantially said reaction zone and maintaining said suspension within said confined path at a particle concentration at least three times as large as that prevailing in said reaction zone and smaller than the particle concentration in said descending bed, introducing said hydrocarbonaceous reactant to the lower portion of the reaction zone at a higher elevation than said bed in the stripping zone and independently of said suspension in said confined path, discharging and laterally expanding said suspension from said confined path to continuously disperse the catalyst particles thereof and simultaneously separating transporting fluid, fluid conversion products and stripping fluid from the dispersed particles in said separating zone and therefrom withdrawing the resultant fluid mixture substantially free of solid particles.

8. A process for catalytically converting a hydrocarbonaceous reactant which comprises dispersing finely divided solid catalyst particles into the upper portion of a vertically elongated reaction zone, passing the dispersed particles downwardly in substantially unidirectional flow through said reaction zone in countercurrent contact with fluid hydrocarbonaceous reactant, subjecting said reactant to conversion during said countercurrent contact with the dispersed catalyst particles, gravitating the contacted catalyst particles from said reaction zone into a descending dense bed thereof maintained in a catalyst stripping zone subjacent to and in unrestricted communication with said reaction zone, passing a stripping fluid countercurrently through said descending bed, withdrawing stripped catalyst particles from the lower portion of said stripping zone downwardly into a descending bed thereof maintained in a confined catalyst regeneration zone subjacent said stripping zone, subjecting the particles in the bed in said regeneration zone to oxidative regeneration by contact with an oxygen-containing regenerating gas, withdrawing regenerated catalyst particles downwardly from the lower portion of said regeneration zone and then commingling them with a stream of transporting fluid to form a suspension, passing said suspension upwardly in a confined path extending through the descending bed in said regeneration zone and said stripping zone and through at least a major portion of said reaction zone to within the upper end portion of the latter, maintaining said suspension within said confined path at a particle concentration which is greater than that prevailing in said reaction zone and smaller than that of said descending beds, introducing said hydrocarbonaceous reactant to the lower portion of the reaction zone at a higher elevation than said bed in the stripping zone and independently of said suspension in said confined path, discharging and laterally expanding said suspension from said confined path to continuously disperse said catalyst particles into the reaction zone and simultaneously separating transporting fluid, fluid conversion products and stripping fluid from the dispersed particles in said upper end portion of the reaction zone, therefrom withdrawing the resultant mixture of fluids, and separately discharging used regeneration gases from said regeneration zone.

9. A process for catalytically converting hydrocarbonaceous reactants which comprises passing dispersed finely divided solid catalyst particles from an elevated separating zone downwardly into a subjacent elongated reaction zone of smaller free cross-sectional area than and in unrestricted communication with said separating zone, passing said dispersed catalyst particles downwardly through said reaction zone in substantially unidirectional flow countercurrently to and in contact with a fluid hydrocarbonaceous reactant, subjecting said reactant to conversion during the countercurrent contact with said dispersed particles, gravitating the contacted catalyst particles from said reaction zone into a subjacent stripping zone in unrestricted communication with said reaction zone and into a descending particle bed maintained in said stripping zone in countercurrent contact with a stripping fluid, withdrawing stripped catalyst particles from the lower portion of said stripping zone downwardly into a descending bed thereof maintained in a confined catalyst regeneration zone subjacent said stripping zone subjecting the particles in the bed in said regeneration zone to oxidative regeneration by contact with an oxygen-containing regenerating gas, withdrawing regenerated catalyst particles from the lower portion of said regeneration zone and then commingling them with a stream of transporting fluid to form a suspension, passing said suspension upwardly in a confined path extending through the descending beds in said regeneration zone and said stripping zone and through substantially said reaction zone and maintaining said suspension within said confined path at a particle concentration at least three times as large as that prevailing in said reaction zone and smaller than the particle concentration in said descending beds, introducing said hydrocarbonaceous reactant to the lower portion of the reaction zone at a higher elevation than said bed in the stripping zone and independently of said suspension in said confined path, discharging and laterally expanding said suspension from said confined path to continuously disperse the catalyst particles thereof and simultaneously separating transporting fluid, fluid conversion products and stripping fluid from the dispersed particles in said separating zone, therefrom withdrawing the resultant mixture of fluids substantially free of solid particles, and separately discharging used regeneration gases from said regeneration zone.

10. A contacting apparatus comprising a vertically elongated shell, a vertical conduit extending upwardly from below the bottom of the shell axially through a major portion of the shell and terminating with an open end near the top portion of the latter, a partition extending inwardly from the vertical wall of said shell toward an intermediate portion of said vertical conduit so as to divide the shell into an upper chamber confining an upper separating section, an intermediate contacting section of smaller free cross-sectional areas than said separating section, and a subjacent stripping section and into a lower chamber confining a lower contacting section, said partition being provided with a central opening around said vertical conduit for the downward passage of solid particles between said conduit and the inner periphery of said partition, a wall member depending from said inner periphery into said lower chamber and spaced from said conduit to form with the latter an annular passageway for the transfer of particles downwardly from said stripping section into said lower contacting section, inlet means provided at an intermediate point in the height of said depending wall member for introducing fluid to said passageway, a discharge well for solid particles extending downwardly from the lower portion of said shell and having a vertical confining wall cylindrically spaced around the lower portion of said vertical conduit so as to define an annular dischargeway of substantially smaller cross-section than that of said intermediate contacting section and adapted to permit withdrawal of solid particles from the lower contacting section as a descending annular column along and around said lower portion of the vertical conduit, said vertical conduit communicating at its lower end with said discharge well, fluid inlet means arranged at the lower portion of said discharge well so as to direct solid particles from the latter in admixture with a fluid stream into said vertical conduit, a fluid distributing header arranged within said shell at the lower end of said intermediate contacting section and having inlet means communicating therewith to permit introducing fluid from outside said shell into said header and therefrom into said intermediate contacting section, fluid inlet and outlet means provided at vertically spaced portions of said lower chamber, and outlet means at the top portion of said shell for withdrawing fluid from said separating section therein.

11. The apparatus of claim 10 wherein said vertical conduit terminates with its open upper end in proximity of the plane of convergence of said intermediate contacting section and said separating section of larger free cross-sectional area than said intermediate contacting section.

12. The apparatus of claim 10 wherein said intermediate contacting section is in substantially unrestricted open communication with both the separating section and the stripping section.

13. The apparatus of claim 10 wherein said fluid distributing header is arranged within said shell annularly around the lower end of said intermediate contacting section and said stripping section is provided with a larger free cross-sectional area than said intermediate contacting section.

14. The apparatus of claim 10 wherein fluid inlet means are provided at an intermediate elevation of said vertical cylindrical wall for introducing fluid to said annular dischargeway.

References Cited in the file of this patent

UNITED STATES PATENTS

| Number | Name | Date |
|---|---|---|
| 2,391,434 | McAfee | Dec. 25, 1945 |
| 2,418,003 | Angell | Mar. 25, 1947 |
| 2,428,873 | Gunness et al. | Oct. 14, 1947 |
| 2,459,824 | Leffer | Jan. 25, 1949 |
| 2,487,961 | Angell | Nov. 15, 1949 |